(12) United States Patent
Akahori

(10) Patent No.: US 8,576,420 B2
(45) Date of Patent: Nov. 5, 2013

(54) IMAGE PROCESSING APPARATUS THAT CAN MAINTAIN SECURITY

(75) Inventor: Taisuke Akahori, Toyokawa (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1491 days.

(21) Appl. No.: 11/704,349

(22) Filed: Feb. 9, 2007

(65) Prior Publication Data

US 2007/0247652 A1 Oct. 25, 2007

(30) Foreign Application Priority Data

Apr. 19, 2006 (JP) .................................. 2006-116027

(51) Int. Cl.
*G06K 15/00* (2006.01)
*G06F 3/12* (2006.01)

(52) U.S. Cl.
USPC ....... 358/1.14; 358/1.15; 358/1.13; 358/3.28; 358/453; 358/462; 382/100; 382/282; 382/284

(58) Field of Classification Search
None
See application file for complete search history.

(56) References Cited

U.S. PATENT DOCUMENTS

| 5,384,785 | A | * | 1/1995 | Yoda | 714/746 |
| 5,815,770 | A | * | 9/1998 | Ogino | 399/87 |
| 5,818,606 | A | * | 10/1998 | Muramatsu et al. | 358/405 |
| 6,005,672 | A | * | 12/1999 | Yoshida | 358/434 |
| 6,115,494 | A | * | 9/2000 | Sonoda et al. | 382/165 |
| 6,323,961 | B1 | * | 11/2001 | Rackman | 358/448 |
| 6,963,422 | B2 | * | 11/2005 | Unno | 358/1.18 |
| 8,045,754 | B2 | * | 10/2011 | Maeno | 382/100 |
| 8,199,341 | B2 | * | 6/2012 | Hikosaka | 358/1.14 |
| 2003/0179399 | A1 | * | 9/2003 | Matsunoshita | 358/1.13 |
| 2004/0184065 | A1 | * | 9/2004 | Guan et al. | 358/1.14 |
| 2006/0098236 | A1 | * | 5/2006 | Yamashita et al. | 358/302 |

FOREIGN PATENT DOCUMENTS

| JP | 7-49645 | | 2/1995 |
| JP | 2002118708 | A * | 4/2002 |
| JP | 2003072166 | A * | 3/2003 |
| JP | 2003-316544 | | 11/2003 |
| JP | 2004-228897 | | 8/2004 |
| JP | 2005-246705 | | 9/2005 |

OTHER PUBLICATIONS

Japanese Office Action dated Mar. 11, 2008, directed to counterpart Japanese Application No. 2006-116027; 5 pages.
Japanese Office Action mailed Oct. 13, 2009, directed to Japanese Application No. 2008-123006; 5 pages.

* cited by examiner

*Primary Examiner* — Satwant Singh
(74) *Attorney, Agent, or Firm* — Morrison & Foerster LLP

(57) ABSTRACT

When an image of a read out document is acquired, an MFP obtains information of a read out state of the image (document orientation or the like) or a copy setting information (magnification and the like), qualified as the copy permissive condition embedded in the image. Copying is permitted only when the read out state of the image or the copy setting of the image matches the permissive condition embedded in the image.

13 Claims, 17 Drawing Sheets

FIG.6

PERMISSIVE CONDITION AND PATTERN EMBEDDING INFORMATION

| PERMISSIVE CONDITION | PATTERN EMBEDDING INFORMATION |
|---|---|
| DOCUMENT ORIENTATION | • PERMISSIVE CONDITION (DOCUMENT ORIENTATION) |
| DOCUMENT PLACEMENT | • PERMISSIVE CONDITION (DOCUMENT PLACEMENT) |
| DOCUMENT READING INFORMATION | • PERMISSIVE CONDITION (ADF/HAND PLACEMENT) |
| PAGE ORDER | • PERMISSIVE CONDITION (PAGE ORDER)<br>• PAGE NUMBER FOR EACH PAGE |
| COMBINATION OF DOCUMENT ORIENTATION | • PERMISSIVE CONDITION (DOCUMENT ORIENTATION FOR EACH PAGE)<br>• PAGE NUMBER FOR EACH PAGE |
| IMAGE EDITING CONDITION | • PERMISSIVE CONDITION (IMAGE EDITING CONDITION)<br>MAGNIFICATION, 2in1, COLOR, DENSITY, AND THE LIKE |

SPECIAL BIT
(Top Bit)

IMAGE PROCESSING APPARATUS THAT CAN MAINTAIN SECURITY

This application is based on Japanese Patent Application No. 2006-116027 filed with the Japan Patent Office on Apr. 19, 2006, the entire content of which is hereby incorporated by reference.

BACKGROUND OF THE INVENTION

1. Field of the Invention

The present invention relates to an image processing apparatus, an image processing method, and an image processing program. Particularly, the present invention relates to an image processing apparatus, an image processing method, and an image processing program that can maintain the security feature without any burden on user operation.

2. Description of the Related Art

In the field of image formation apparatuses such as an MFP (Multi Function Peripheral), copy machine, printer, and the like, there is the higher demand for a security feature that prevents illegal copying of a document.

One known technique to improve the security feature is to embed some security information into the document at the time of print out to prohibit copying when the security information is read out in an attempt to copy that document. This approach to prohibit copying by detecting copy prohibition information in the read out document is known.

There is also known the approach to allow copying, when the document includes copy prohibition information, by entering a password.

Japanese Laid-Open Patent Publication No. 07-049645 discloses a copy control method to control copying of a confidential document or the like in a copy machine. In accordance with this method, the image is read out in a digital form at the copy machine that includes an internal non-volatile memory. In a copy operation, the password or identification number (ID No.) of the operator, and also the identification number of the person to which the document is to be distributed, are requested.

When the request is satisfied, the copy machine initiates the reading operation of the document. The copy machine reads out the input ID number from a specific pattern in the document and searches for the set of a password, document ID number and the ID number of the distributing party stored in the aforementioned memory. When the ID number of the distributor and the document ID number both are already stored in the memory as a result of the search, a signal is issued to restrict the copy operation.

Thus, the known method to allow copying involves entry of a password by means of an operation panel or the like. However, the operation of entering such a password may be burdensome to the user.

SUMMARY OF THE INVENTION

In view of the foregoing, an object of the present invention is to provide an image processing apparatus that can maintain a security feature without any burden on user operation.

According to an aspect of the present invention, an image processing apparatus includes an acquirement portion acquiring an image of a document read out, a detector detecting at least one of a read out state of the image and a setting for copying the image, and a controller permitting or prohibiting at least a part of the operation of the image processing apparatus based on the detected result by the detector.

According to another aspect of the present invention, an image processing apparatus includes an image memory to store image data, a permissive condition setting portion to set at least one of a read out state of the image and a copy setting, qualified as the condition for permitting processing of image data at the image processing apparatus, a pattern conversion portion converting the permissive condition into a pattern that can be detected in a document read out mode, a pattern combiner generating a combined image of image data and the pattern, and an image output portion printing out the combined image of the pattern combiner.

According to the present invention, at least one of the read out state of the image and a setting for copying an image is detected, and at least a part of the operation of the image processing apparatus can be permitted or prohibited based on the detected result. Thus, an image processing apparatus that can maintain the security feature without any burden on user operation can be provided.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 represents the relationship between the permissive condition and information embedded as a pattern.

DESCRIPTION OF THE PREFERRED EMBODIMENTS

First Embodiment

Figure 1:
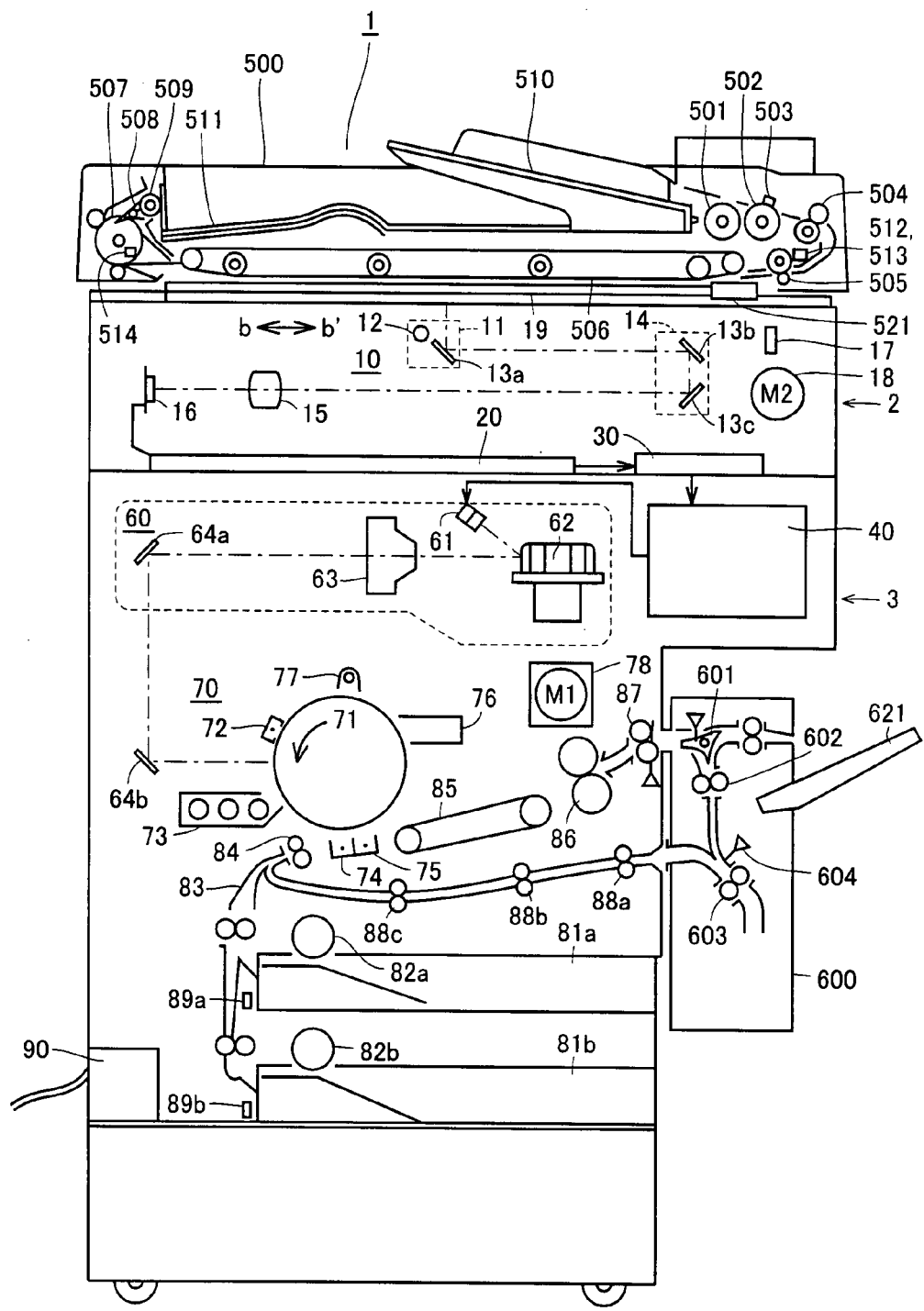
FIG. 1 represents an entire configuration of a digital copy machine (MFP) according to a first embodiment of the present invention.

Referring to FIG. 1, a copy machine 1 includes a scanning system 10 to read out a document for conversion into image signals, an image signal processor 20 to process an image signal sent from scanning system 10, a memory unit 30 storing image data transmitted from image signal processor 20 for transmission to a print processor 40, a print processor 40 to drive a semiconductor laser 61 based on image data transmitted from memory unit 30, a laser optical system 60 to direct the laser beam from semiconductor laser 61 to a site of exposure on a photoconductor drum 71, an image formation system 70 developing a latent image formed on photoconductor drum 71 by the laser beam to form an image on a recording sheet, an operation panel not shown provided at the top surface of copy machine 1, and a document transporter 500 transporting the document to a reader 2 and then removing the document subjected to reading from the readout position to reverse the front and back sides, as necessary.

Reader 2 includes scanning system 10 and image signal processor 20. A printer 3 includes a print processor 40, laser optical system 60, and image formation system 70.

Reader 2 reads out the image of a document placed on a glass platen 19 with the reading side downwards to generate image data corresponding to each pixel in the image of that document. A first scanner 11 including an exposure lamp 12 and a first mirror 13*a* and a second scanner 14 including a second mirror 13*b* and a third mirror 13*c* are moved in the direction of arrows b and b' (subscanning direction) by the drive of a scan motor 18. The light from exposure lamp 12 is reflected by the document on glass platen 19 to be directed to a line sensor 16 via mirrors 13*a*, 13*b* and 13*c* and a collective lens 15. Line sensor 16 has a plurality of photoelectric conversion elements arranged on the line in a direction orthogonal to the drawing sheet plane of FIG. 1 (main scanning direction) to read out an image at 400 dpi, for example, to output image data corresponding to each pixel. Since first and second scanners 11 and 14 move in the direction of arrows b and b', as set forth above, line sensor 16 can subscan the image of the document. Sensor 17 functions to detect that first scanner 11 is located at the home position.

The image data output from line sensor 16 is processed at image signal processor 20, and then sent to memory unit 30. Memory unit 30 compresses and stores temporarily the image data received from image signal processor 20. When the image data is to be printed out, an expansion process is applied on the compressed image data for transmission to printer 3. At this stage, a rotation-editing process or the like is applied, as necessary.

Print processor 40 in printer 30 controls laser optical system 60 based on image data received from memory unit 30. Laser optical system 60 includes a semiconductor laser 61 emitting a laser beam that is modulation-controlled (on/off) by print processor 40, a polygon mirror 62 reflecting the laser beam emitted from semiconductor laser 61 for scanning on photoconductor drum 71, an fθ lens 63, and mirrors 64*a* and 64*b*.

Around photoconductor drum 71 that is driven in rotation are provided, along the direction of rotation, a corona charger 72 to charge the photoconductor, a developer 73 to develop a latent image formed by exposure, a transfer charger 74 to transfer the image onto a recording sheet, a separation charger 75 to detach the recording sheet from photoconductor drum 71, a cleaner 76 to remove the remaining toner on photoconductor drum 71, and an eraser lamp 77 to remove the electric charges remaining on the photoconductor. A toner image is formed and transferred onto a sheet in accordance with the well-known electronic electrophotographic process. The sheet is delivered from a sheet feed cassette 81*a* or 81*b* by a sheet feed roller 82*a* or 82*b* to a transfer position facing transfer charger 74 and photoconductor drum 71 through a sheet transportation channel 83 and a timing roller 84. The sheet having the toner image transferred at the transfer position is output onto an output tray 621 via a transportation belt 85, a fixer 86, and an eject roller 87. Eject roller 87 and photoconductor drum 71 are driven by a main motor 78. Additionally, remaining sheet detection sensors 89*a* and 89*b* to detect the remaining amount of sheets stored in each cassette are provided in the neighborhood of sheet feed cassettes 81*a* and 81*b*.

Document transporter 500 automatically delivers the document set on document sheet feed tray 510 to the reading position on glass platen 19. When the document is converted into image signals by scanning system 10, the document is transported from the reading position to a document eject portion 511.

Generally one or more sheets of documents are set on document sheet feed tray 510 with the side to be read out upwards. The size regulating plate is set to the width of the document. The set documents are transported by sheet feed roller 501 in order from the bottom-most document to be transported to the reading position one by one while being unloosened by a separator roller 502 and a separator pad 503. The transported document passes through an intermediate roller 504 to be detected by a registration sensor 512 and a width size sensor 513, and then corrected, if inclined, by a registration roller 505. As soon as the trailing end of the document passes the left end of a document scale 521, a document transportation belt 506 moves slightly in the opposite direction and stops.

Accordingly, the right end of the document abuts against the edge of document scale 521, such that the document is located at the reading position on glass platen 19. At this stage, the leading end of the next document has reached registration roller 505 to shorten the transportation time of the succeeding document.

When a document is placed at the reading position on glass platen 19, a read-scan operation is carried out on the document by scanning system 10. When the reading operation of the document ends, the document is transported leftwards by document transportation belt 506, and then has the transportation direction modified by a reverse roller 507, and passes over a switching claw 508 to be ejected on output tray 511.

In the case of a double-sided document, the document subjected to the read out operation of the first plane is transported leftwards by document transportation belt 506, and then has the orientation of the document reversed by reverse roller 507. Then, the left end of switching claw 508 moves upwards such that the document is delivered onto glass platen 19 again. The reverse rotation of document transportation belt 506 causes the second plane (backside) of the document to be located at the reading position. When the reading operation of the second plane is completed, the document is transported leftwards by document transportation belt 506 to be ejected on output tray 511 via reverse roller 507, switching claw 508 and discharge roller 509.

A refeed unit 600 is provided at the side plane of printer 3 as an additional apparatus for automization of a double-sided copy operation. Refeed unit 600 functions to temporarily store the sheet output from the main unit of copy machine 1 by eject roller 87, and then deliver the sheet to printer 3 through a switch-back transportation.

In a single-sided copy mode, the sheet simply passes through refeed unit 600 to be ejected on output tray 621. In a double-sided copy mode, the left end of switching claw 601 moves upwards by a solenoid not shown, such that the sheet delivered from eject roller 87 passes through transportation roller 602 to reach a positive/forward reverse roller 603. In the event of the trailing end of the sheet arriving at sheet sensor 604, positive/forward-reverse roller 603 initiates its reverse. Accordingly, the sheet returns to printer 3. The returned sheet passes through horizontal transportation rollers 88a, 88b, and 88c to be delivered to a timing roller 84 for standby. In the case where a plurality of sheets are fed in succession, a predetermined interval for sheets is provided such that each sheet will not overlap with each other. The sheets are sequentially transported to refeed portion 600. Since the sheet transportation path length is constant, the number of sheets in one circulation by refeed portion 600 and horizontal transportation rollers 81a-81c (the maximum sheets per circulation) depends on the size of the sheet.

A network connector 90 is provided at copy machine 1 to allow information to be transferred through a network.

Copy machine 1 takes the document reading condition (the read out state) or copy setting as the copy permissive condition, and permits copying only when the document read out condition or the like at the time of copying meets the permissive condition that has been set. In other words, the document read out condition or the like is taken as the security information.

Figure 2:
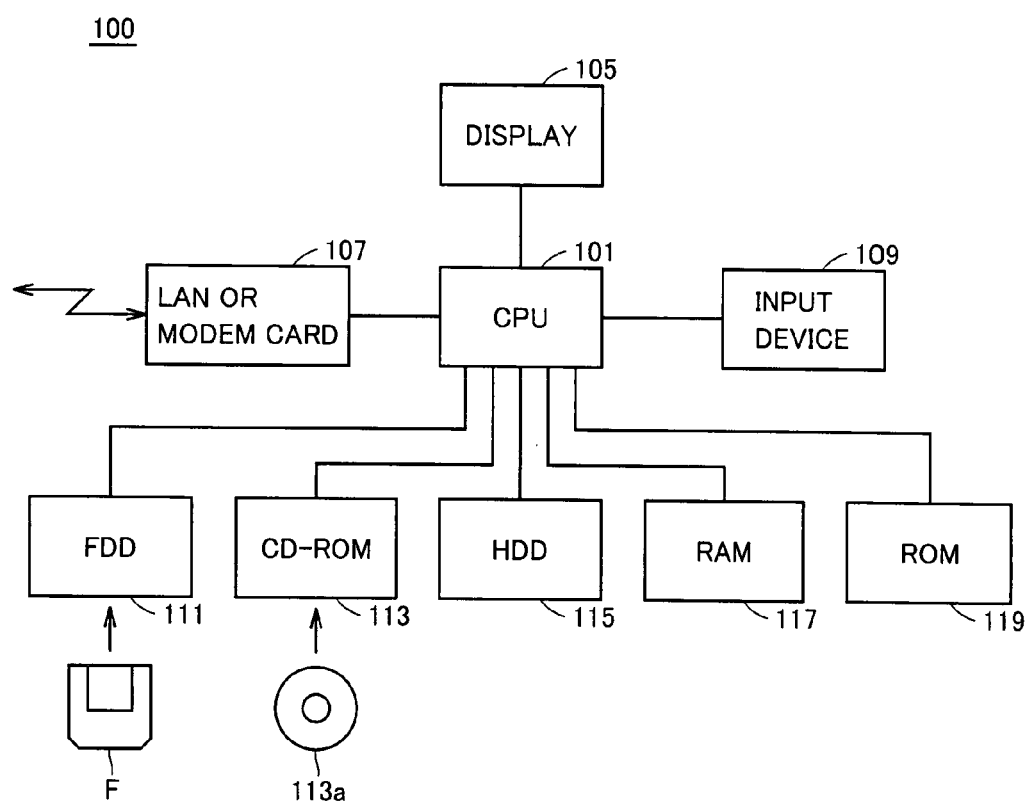
FIG. 2 is a block diagram representing a hardware configuration of a PC (Personal Computer) connected to a digital copy machine 1 of FIG. 1.

FIG. 2 is a block diagram representing a hardware configuration of a PC connected to digital copy machine 1 of FIG. 1.

Referring to FIG. 2, the PC includes a CPU (Central Processing Unit) 101 for the overall control of the apparatus, a display 105, a LAN (Local Area Network) card 107 (or a modem card) for connection to a network and/or communication with an external source, an input device 109 formed of the keyboard, mouse, and the like, a flexible disk drive 111, a CD-ROM (Compact Disk-Read Only Memory) drive 113, a hard disk drive 115, a RAM (Random Access Memory) 117, and a ROM 119.

Flexible disk drive 111 allows data such as a program recorded on a flexible disk F to be read out. CD-ROM drive 113 allows data such as a program recorded on a CD-ROM 113a to be read out.

Figure 3:
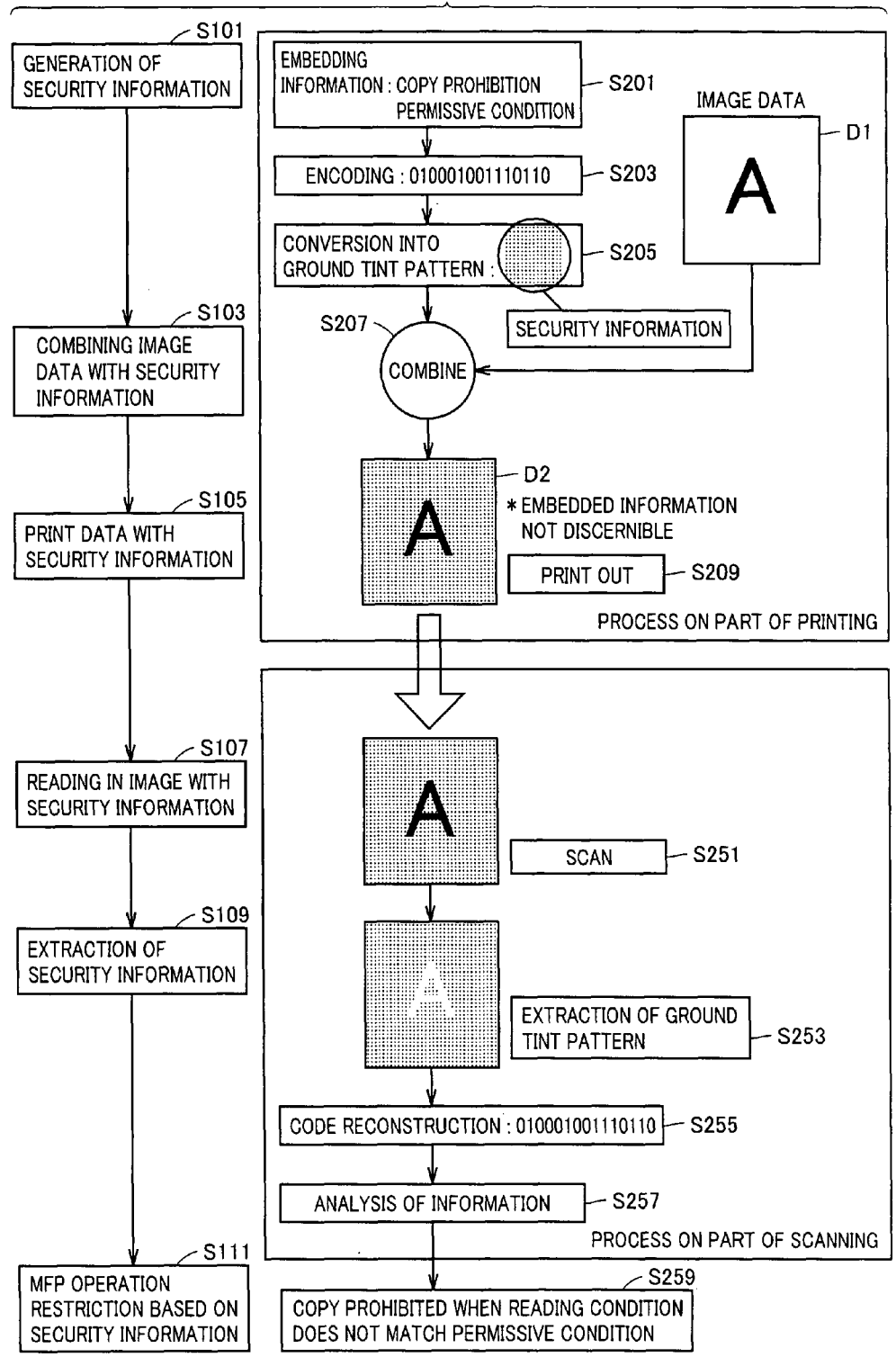
FIG. 3 is a diagram to describe the security feature of copy machine 1.

FIG. 3 is a diagram to describe the security feature of copy machine 1.

In the present embodiment, a process of printing out an image with a ground tint pattern on a sheet, and a process of reading the same with a scanner are executed to realize the security feature.

General outlines are set forth below. At step S101, security information is generated. At step S103, image data that is the subject of printing is combined with the security information. At step S105, the print data with security information is obtained. Printing is conducted based on the obtained data, resulting in a printout. The process of steps S101-S105 corresponds to the process of producing a document with security information. The process of steps S107 and et seq. is to be carried out when a copy of the document produced at steps S101-S105 is to be taken.

At step S107, the printout obtained at step S105 is scanned to read in an image with security information. At step S109, the security information is extracted from the image. At step S111, restriction on the operation of the MFP based on security information is effected.

Specifically, when the original image data to be printed out is D1, as indicated at the right section of FIG. 3, the information to be embedded is input at step S201. It is now assumed that "copy prohibited" information and the permissive condition qualified as the condition for permitting copying are to be embedded. At step S203, the information to be embedded is encoded. At step S205, the encoded information is set as a ground tint pattern. Thus, security information is generated in the form of dots.

At step S207, image data D1 is combined with the pattern generated at step S205. Accordingly, print data D2 with security information is obtained. At step S209, print data D2 with security information is printed out on a sheet. The contents represented by the information embedded as dots cannot be distinguished by the naked eye.

At step S251, image data is obtained by scanning the sheet on which print data D2 with security information is printed out. At step S253, the ground tint pattern (security pattern) is extracted from the image data. At step S255, the code is restored from the ground tint pattern. At step S257, the information is analyzed.

At step S259, copying is prohibited when the read out condition (scanning condition) and the copy setting on the sheet where print data D2 with security information is printed out does not match the permissive condition input at step S201. In contrast, copying is permitted when the read out condition and the copy setting on the sheet where print data D2 with security information is printed out matches the permissive condition input at steps 201.

Although the processes set forth above are described in succession for the sake of simplifying the description, the document producing process and the process in a copy mode do not have to be carried out continuously.

Figure 4:
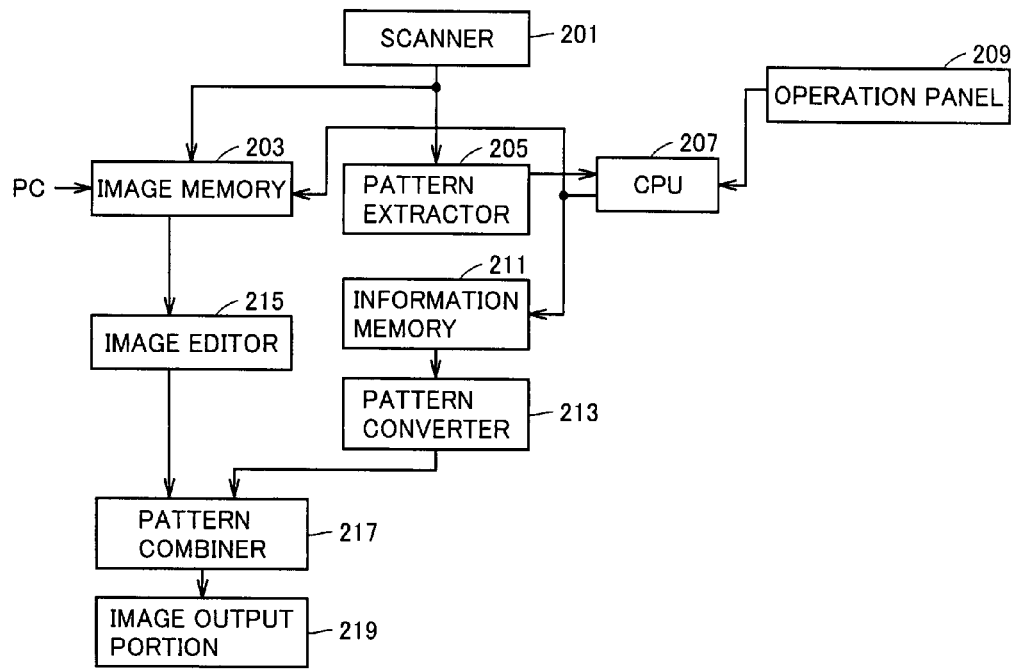
FIG. 4 is a block diagram representing the functional configuration of the digital copy machine of FIG. 1.

FIG. 4 is a block diagram of the function configuration of the digital copy machine of FIG. 1.

Referring to FIG. 4, digital copy machine 1 includes a scanner 201 (corresponding to reader 2 in FIG. 1), an image memory 203, a pattern extractor 205, a CPU 207, an operation panel 209, an information memory 211, a pattern converter 213, an image editor 215, a pattern combiner 217, and an image output portion 219 (corresponding to printer 3 in FIG. 1).

The scanning operation and printing operation of a document with security information will be described hereinafter.

<Scanning Operation>

Operation panel 209 allows the setting of the document read out condition and/or copy setting. Scanner 201 functions to read a document and convert the same into image data. Image memory 203 stores that image data. Pattern extractor 205 extracts the ground tint pattern from the image data. CPU 207 analyzes the ground tint pattern to extract security information therefrom.

CPU 207 also compares the security information extraction result with the read out condition set through operation panel 209 and the like to control the permission/prohibition of copying.

<Printing Operation>

Image memory 203 stores image data to be printed out. In a copy operation, image data from scanner 201 is stored. In the event of a PC print, print data transmitted from a PC is stored.

Information memory 211 stores the security information to be embedded in a document. This corresponds to copy prohibition information, copy permissive condition information, and the like. CPU 207 controls image memory 203 and information memory 211. Image editor 215 edits image data, if necessary.

Pattern converter 213 converts the data in information memory 211 into a ground tint pattern. Pattern combiner 217 combines the image data with the ground tint pattern. Image output portion 219 prints out the combined data.

The operation of embedding information will be described hereinafter based on the configuration of FIG. 5 that represents the PC and image formation apparatus of FIG. 2.

Figure 5:
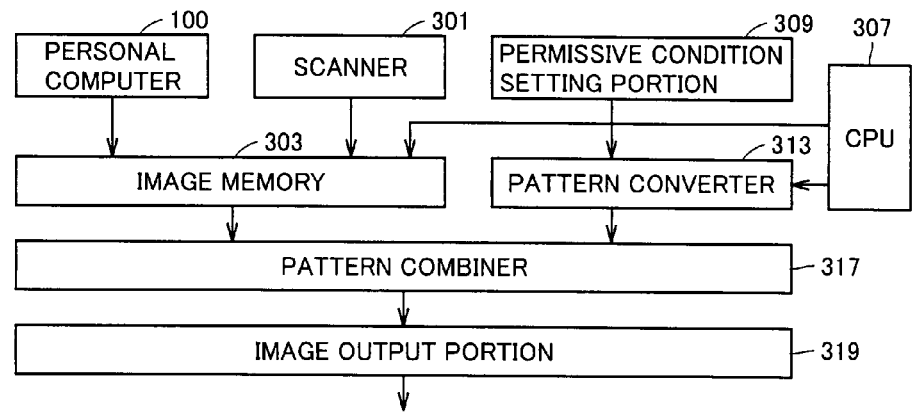
FIG. 5 represents a configuration of an image formation apparatus employing the PC of FIG. 2.

Referring to FIG. 5, the image formation apparatus includes a PC 100, a scanner 301, an image memory 303, a CPU 307, a permissive condition setting portion 309 formed of keys, a liquid crystal display and the like, a pattern converter 313, a pattern combiner 317, and an image output portion 319.

The functions other than those of PC 100 can be implemented by the printer, MFP, and the like.

PC 100 outputs image data to image memory 303 at the time of PC printing. Scanner 301 reads in the document image in the copy operation to output the image data to image memory 303. Image memory 303 stores the image data, which is output to pattern combiner 317 under control of CPU 307. Permissive condition setting portion 309 sets the copy permissive condition.

Pattern converter 313 converts the copy prohibition information and the permissive condition setting into a ground tint pattern, which is output to pattern combiner 317 under control of CPU 307. Pattern combiner 317 combines the image data with the ground tint pattern. Image output portion 319 prints out the combined data.

The outline of embedding security information will be described hereinafter. FIG. 6 represents the relationship between the permissive condition and the information to be embedded as the ground tint pattern.

When the document orientation is set as the permissive condition, the document orientation qualified as the condition for permitting copying is embedded as the ground tint pattern.

When the document placement is set as the permissive condition, the document placement qualified as the condition for permitting copying is embedded as the ground tint pattern.

When document reading information is set as the permissive condition, the document reading manner of either by an ADF (Automatic Document Feeder) or by hand placement, qualified as the condition for permitting copying, is embedded as the ground tint pattern.

When the page order is set as the permissive condition, the page order of the document and the page number for each page, qualified as the condition for permitting copying, are embedded as the ground tint pattern.

When the document orientation combination is set as the permissive condition, the document orientation for each page and the page number for each page, qualified as the condition for permitting copying, are embedded as the ground tint pattern.

When the image editing condition is set as the permissive condition, an image editing condition (magnification, 2in1, color, density, or the like), qualified as the condition for permitting copying, is embedded as the ground tint pattern.

Figure 7:
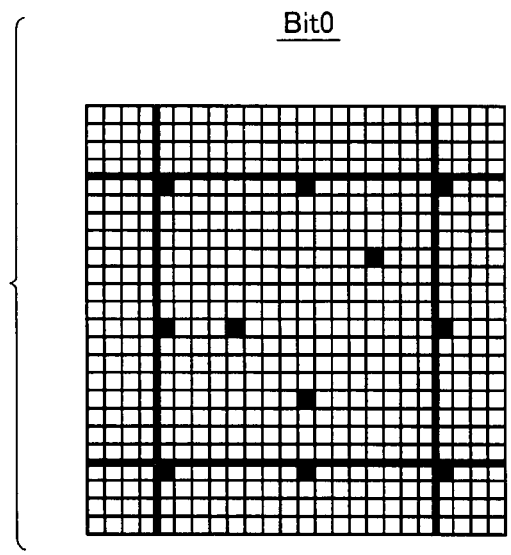
FIGS. 7-9 represent the smallest portion of the embedded pattern constituting a ground tint pattern.
Figure 8:
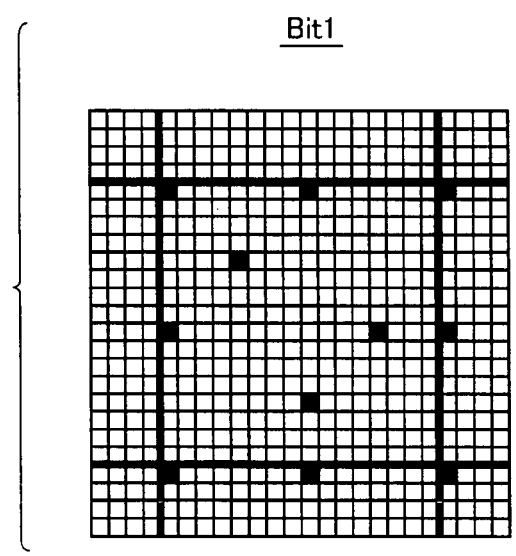
Figure 9:
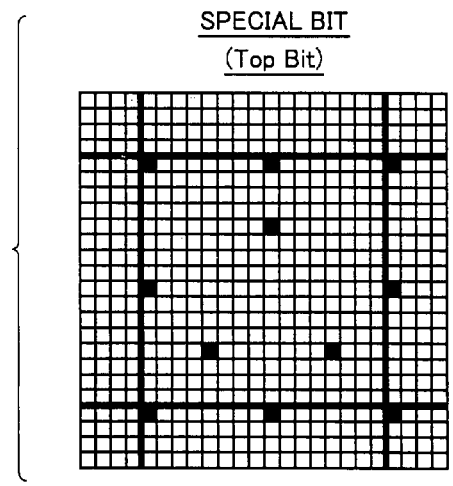

FIGS. 7-9 represent the minimum portion of an embedded pattern constituting a ground tint pattern. The embedded pattern is formed of the three types of bit cells of FIGS. 7-9, labeled as Bit0, Bit1, and special Bit (TopBit), respectively.

Bit0 and Bit1 are information bits. TopBit is used for positioning to detect a block of a group of information bits.

14×14 bit cells constitute a "block cell". The encoded permissive condition that is the embedded information is described by the block cell. At the time of print out, a block cell is printed out repetitively.

The outline of ground tint pattern extraction will be described hereinafter. The ground tint pattern extraction can be classified into the five processes set forth below.

(1) Dot detection
(2) Inclination detection
(3) Direction detection
(4) Bit determination
(5) Information extraction Each process will be described hereinafter.

Figure 10:
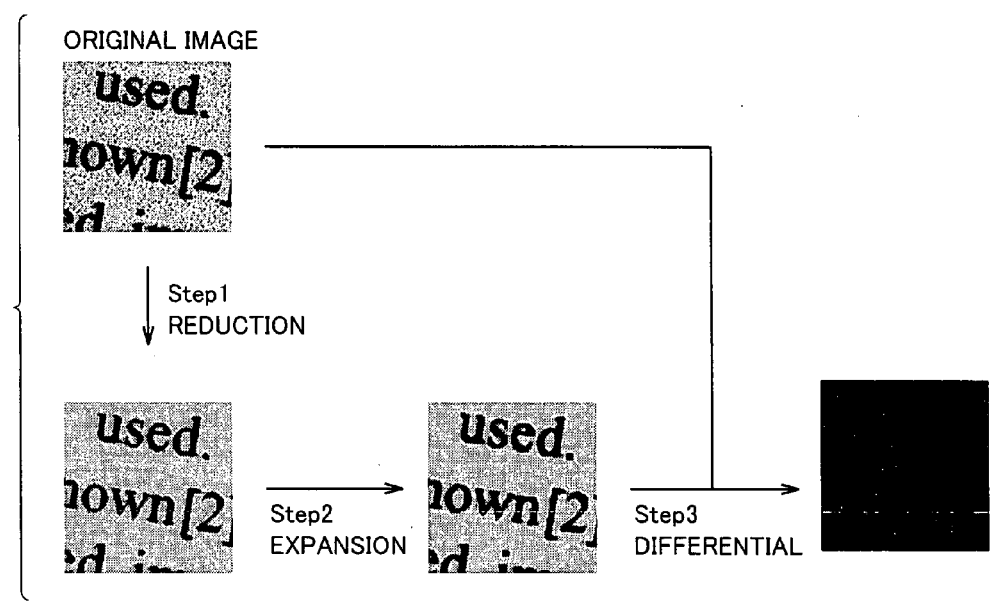
FIG. 10 represents a dot detection process.

FIG. 10 represents a dot detection process. In a dot detection process, the original image is subjected to a MAX filter (a filter that outputs the dot with the largest value among nine dots corresponding to a pixel of interest and surrounding pixels) and a MIN filter (a filter that outputs the dot with the smallest value among nine dots corresponding to a pixel of interest and surrounding pixels) in order to remove only dots. By the difference between that image and the original image, detection of dots can be made.

Figure 11:
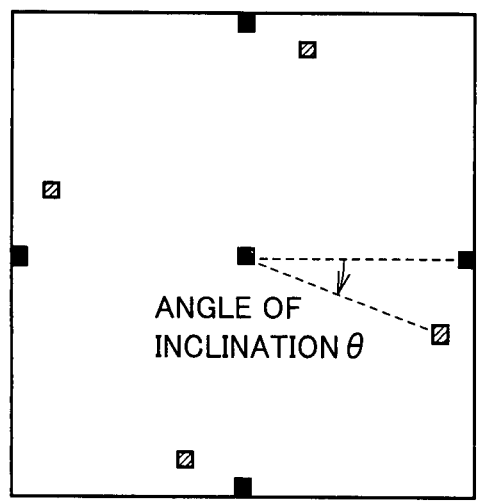
FIG. 11 represents an inclination detection process.

FIG. 11 represents an inclination detection process.

Since a document is not always read out at a constant angle, the document inclination must be detected in order to properly detect the security information.

Since the dot image detected at the dot detection process is formed of bit cells, the dot image includes many dot distance components of the bit cell. Therefore, a plurality of filters with the dot distance of bit cells are arranged in parallel, inclined little by little, and the inclination corresponding to the highest detection count is detected as the inclination of the reading document.

Figure 12:
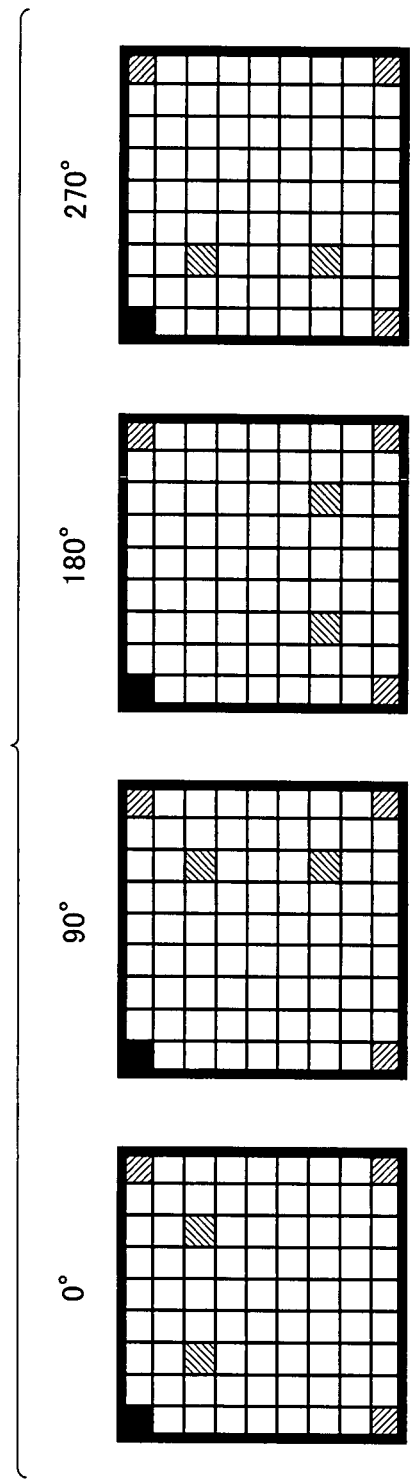
FIG. 12 represents a direction detection process.

FIG. 12 represents a direction detection process.

In the inclination detection process set forth above, an inclination of less than 90 degrees can be detected, whereas the orientation (0°/90°/180°/270°) cannot be detected. For the purpose of identifying the direction based on the dot bias of the bit cells, a filter as shown in FIG. 12 is employed.

Figure 13:
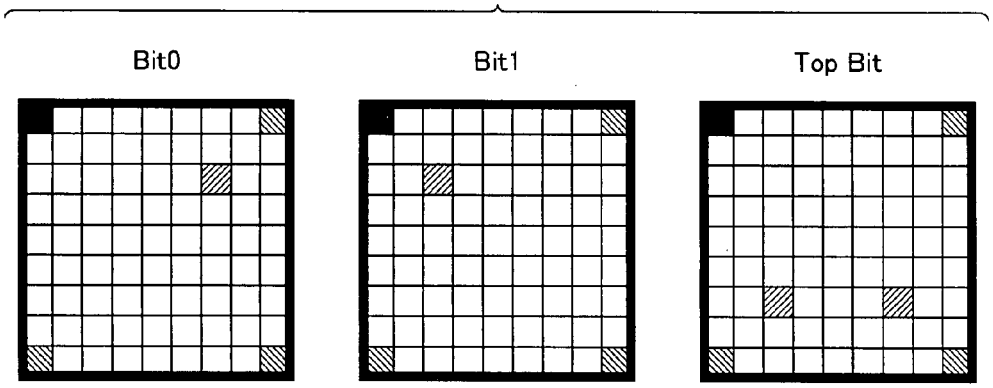
FIG. 13 represents a Bit determination process.

FIG. 13 represents a Bit determination process. Bit information is extracted by applying a filter process as shown in FIG. 13 on the detected direction. The security information extraction process is executed based on the extracted Bit information.

In the present embodiment, it is assumed that the information of "copy permitted only with document in landscape orientation" is embedded into the image as the security information. When that document is to be copied, copying is not allowed unless the document is placed in landscape orientation (unless the image is read out in landscape orientation).

Figure 14:
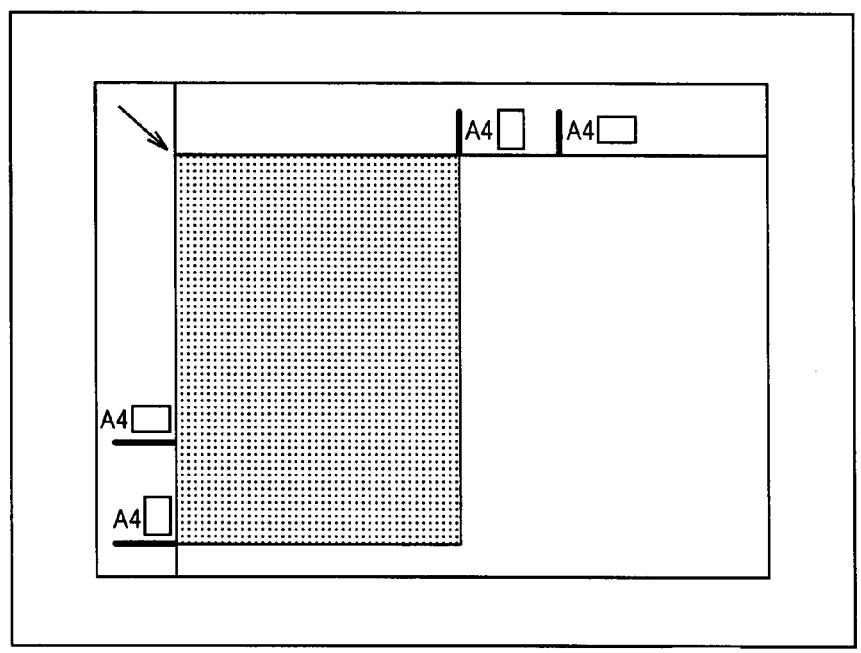
FIG. 14 shows a document in a portrait orientation.
Figure 15:
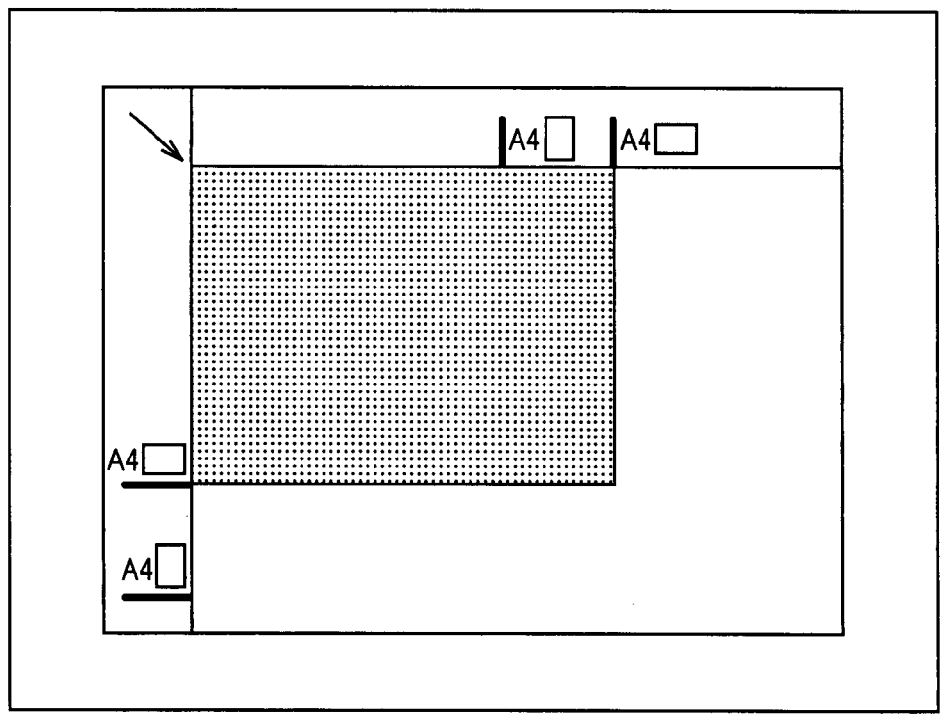
FIG. 15 shows a document in a landscape orientation.

FIGS. 14 and 15 are plan views of glass platen 19. FIG. 14 corresponds to the case where the document is placed in portrait orientation. FIG. 15 corresponds to the case where the document is placed in landscape orientation.

In the drawings, the shaded area represents a document. A portrait orientation corresponds to the state where the longer side of the document is set in the vertical direction when viewed by the user (FIG. 14). A landscape orientation corresponds to the state where the longer side of the document is set in the horizontal direction when viewed by the user (FIG. 15).

Figure 16:
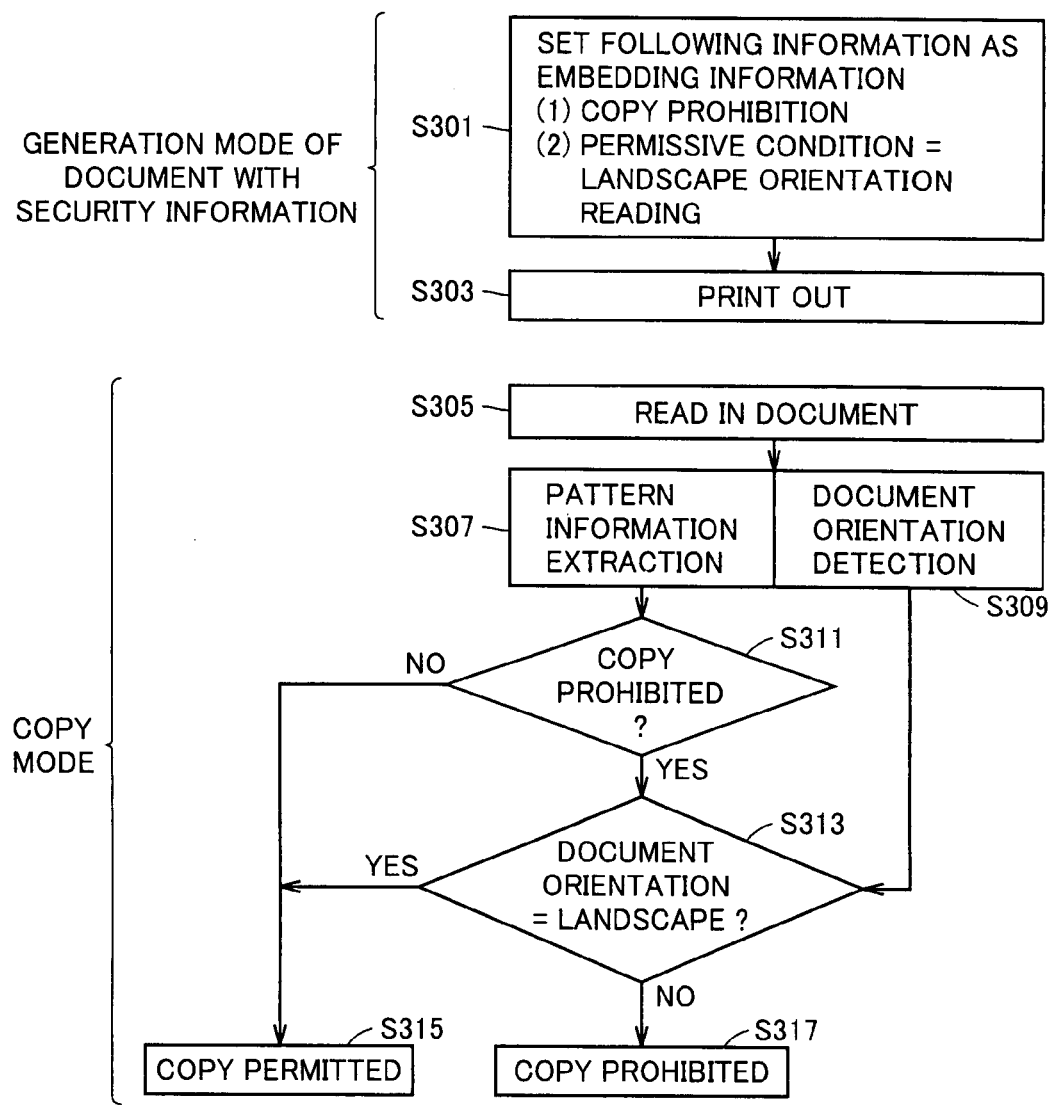
FIG. 16 is a flow chart of the process executed by an image formation apparatus according to the first embodiment.

FIG. 16 is a flow chart of the process executed by the image formation apparatus of the first embodiment.

At step S301 of FIG. 16, the copy prohibition information and the permissive condition of "copy permitted only with document in landscape orientation" are set as the embedding information (security information). At step S303, a print out operation is conducted based on the information.

At step S305, the document printed out at step S303 is read in. In this operation, the information of the embedded ground tint pattern is extracted at step S307, and the document reading direction is detected at step S309.

At step S311, determination is made whether copy prohibition information is embedded or not. When YES, control proceeds to step S313 to determine whether the document is placed in landscape orientation. When NO at step S313, control proceeds to S317 to prohibit copying. When NO at step S311 or YES at S313, i.e. when the document placement satisfies the permissive condition, copying is permitted at step S315.

Although these processes are described in succession for the sake of simplifying the description, the document production process (steps S301 and S303) and the process at the time of copying (steps S305-S317) do not necessarily have to be carried out continuously.

In accordance with the present embodiment, since the document read out condition functions in lieu of a password for copying, copying can be permitted only to a specific user without the requirement of the user to enter a password through keys. Thus, the security feature can be maintained.

Second Embodiment

An image formation apparatus according to a second embodiment of the present invention has a configuration similar to that of the first embodiment. Therefore, description thereof will not be repeated.

Figure 17:
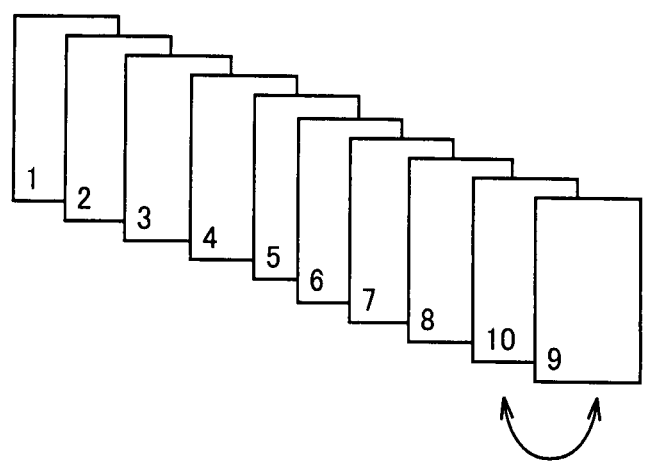
FIG. 17 is a diagram to describe an operation of an image formation apparatus according to a second embodiment.

A document read out condition is employed in lieu of a password also in the present embodiment. For example, in taking copies of a document of 10 pages, the condition of "copy permitted only when the document order of the ninth page and tenth page is interchanged" is embedded as the security information. When those documents are to be copied, copying is not allowed unless the documents of the ninth page and tenth page are interchanged, as shown in FIG. 17.

Figure 18:
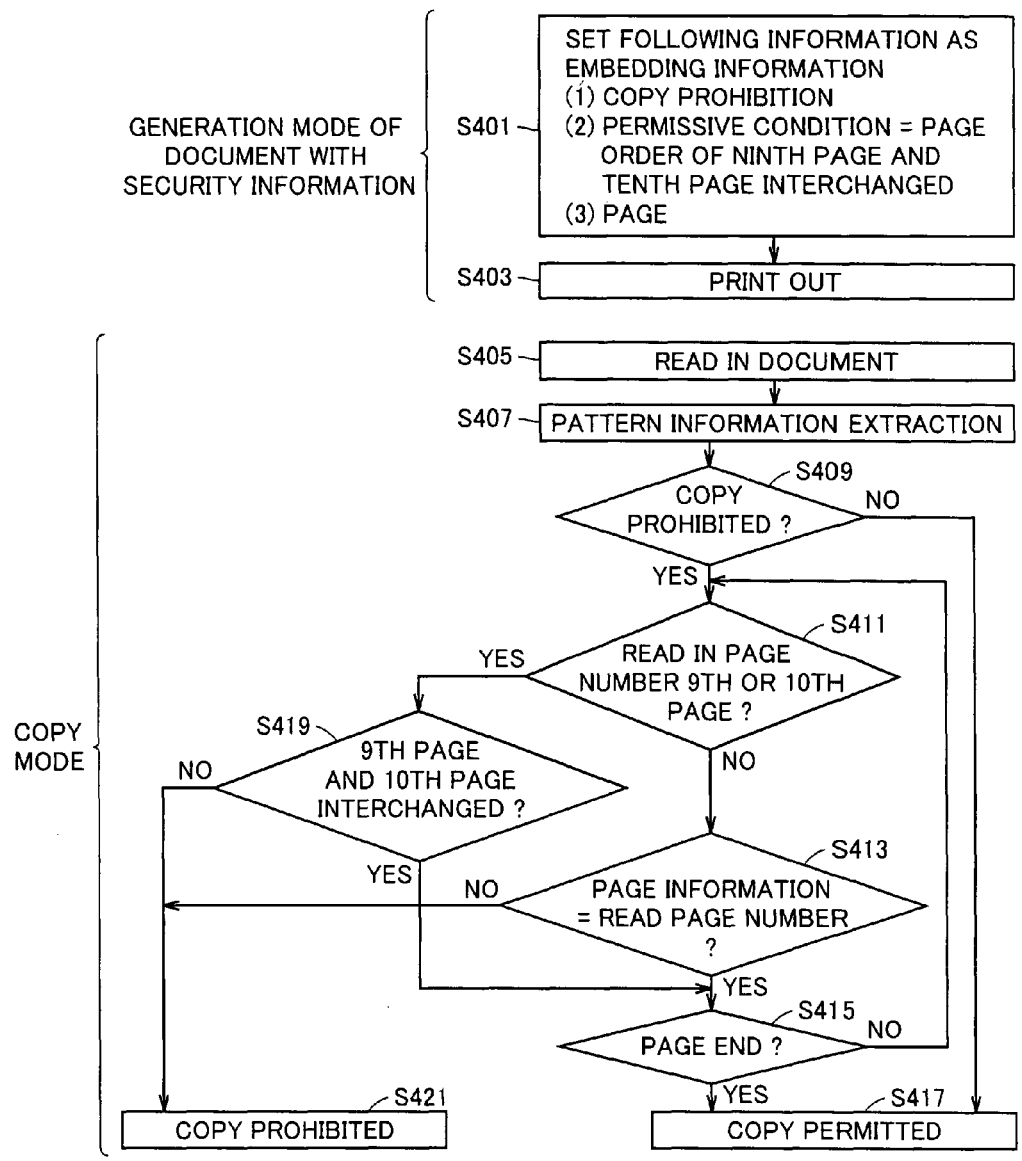
FIG. 18 is a flow chart of the process executed by the image formation apparatus of the second embodiment.

FIG. 18 is a flow chart of the process executed by the image formation apparatus of the second embodiment.

At step S401 of FIG. 18, the copy prohibition information, the permissive condition of "document order of 9th page and 10th page is interchanged", and the page number information of each image are set at the embedding information. At step S403, a printout is obtained based on that information.

At step S405, the document printed out at step S403 is read. At step S407, information of the embedding ground tint pattern is extracted.

At step S409, determination is made whether copy prohibition information is embedded or not. When YES, control proceeds to step S411 to determine whether the document reading page is the ninth page or the tenth page. When NO at step S411, determination is made whether the document reading page is equal to the number in the embedded page information at step S413. When YES at step S413, control proceeds to step S415.

When YES at step S411, control proceeds to step S419 to determine whether the documents of the ninth page and tenth page are interchanged. When NO at step S419, control proceeds to step S421 to prohibit copying. When YES at S419, i.e. when the ninth page and the tenth page are interchanged, control proceeds to step S415.

When NO at step S413, control proceeds to step S421.

When NO at step S415, control returns to step S411 to carry out the next read page process. When determination is made that all the pages has been read (YES) at step S415, control proceeds to step S417 to permit copying since it is indicated that only the ninth page and the tenth page has been interchanged among the ten-page document. When NO at step S409, control proceeds to step S417.

In the present embodiment, the order of the documents, qualified as the document reading condition, functions in lieu of a password in a copy operation by the processes set forth above. Accordingly, copying can be permitted to only a specified user without the requirement of the tedious key input of a password by the user. Thus, the security feature can be maintained.

Third Embodiment

An image formation apparatus according to a third embodiment of the present invention has a configuration similar to that of the first embodiment. Therefore, description thereof will not be repeated.

Figure 19:
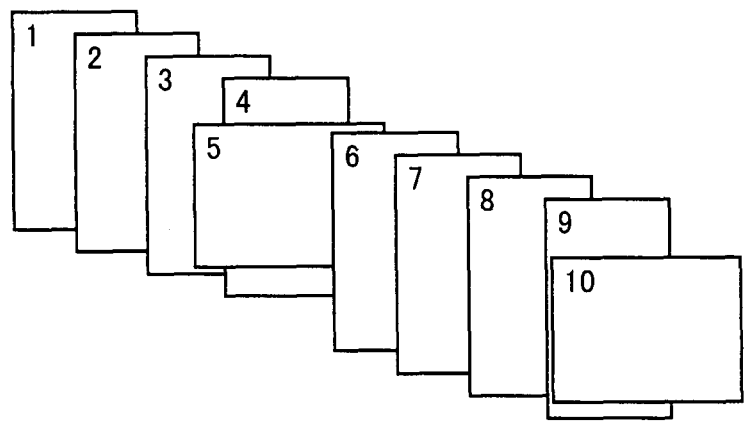
FIG. 19 is a diagram to describe an operation of an image formation apparatus according to a third embodiment.

The document read out condition is employed instead of a password also in the present embodiment. For example, when a copy of a 10-page document is to be taken, the information of "copying permitted only when fifth page and tenth page are located in landscape orientation" is embedded as the security information. In the copy operation of that document, copying is not allowed unless the documents of the fifth page and tenth page are oriented in a landscape manner, as shown in FIG. 19.

As used herein, "landscape orientation" corresponds to the case where the document is set as shown in FIG. 15.

Figure 20:
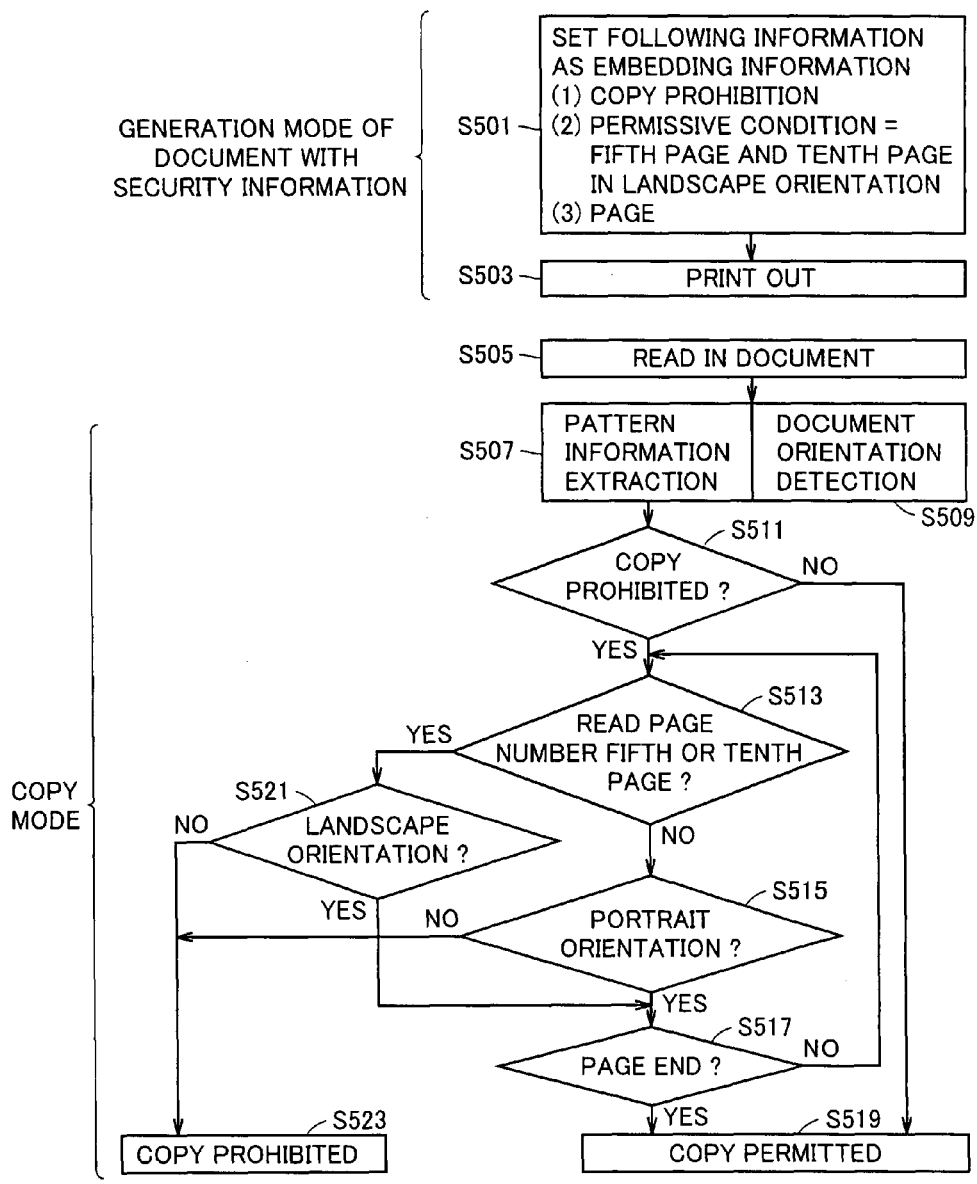
FIG. 20 is a flow chart of the process executed by the image formation apparatus of the third embodiment.

FIG. 20 is a flow chart of the process executed by the image formation apparatus of the third embodiment.

At step S501 in FIG. 20, the copy prohibition information, the permissive condition of "documents of fifth page and tenth page are placed in landscape orientation", and the page number information of each image are set as the embedding information. At step S503, a printout is obtained based on that information.

At step S505, the document printed out at step S503 is read in. At step S507, information of the embedded ground tint pattern is extracted. Also, the document orientation information is detected at step S509.

At step S511, determination is made whether copy prohibition information is embedded or not. When YES, control proceeds to step S513 to determine whether the document reading page is the fifth page or tenth page. When NO at step S515, determination is made whether the document is placed in portrait orientation. When YES at step S515, control proceeds to step S517.

When YES at step S513, control proceeds to step S521 to determine whether the document is placed in landscape orientation. When NO at S521, control proceeds to S523 to prohibit copying. When YES at step S521, control proceeds to step S517.

When NO at step S517, control returns to step S513 to carry out the next read page process. At step S517, determination is made whether the process for all the pages has ended or not. When YES, control proceeds to step S519 to permit copying since it is indicated that only the fifth page and tenth page among the ten pages are placed in landscape orientation. When NO at step S511, control proceeds to step S519.

When NO at step S515, control proceeds to step S523.

By the processes set forth above, the document page and orientation (combination of document orientation), qualified as the document reading condition, function as a password in a copy operation in the present embodiment. Therefore, copying can be permitted to only the specified user without the requirement of the tedious key input of a password by the user. Thus, the security feature can be maintained.

Fourth Embodiment

An image formation apparatus according to a fourth embodiment of the present invention has a configuration similar to that of the first embodiment. Therefore, description thereof will not be repeated.

The document copy condition (copy setting) is employed in lieu of a password in the present embodiment. For example, when a copy of a document is to be produced, the information of "copy permitted only when magnification setting is 0.5 times" is embedded as the security information. When that document is to be copied, copying is not allowed unless the copy magnification is set to 0.5 times.

Figure 21:
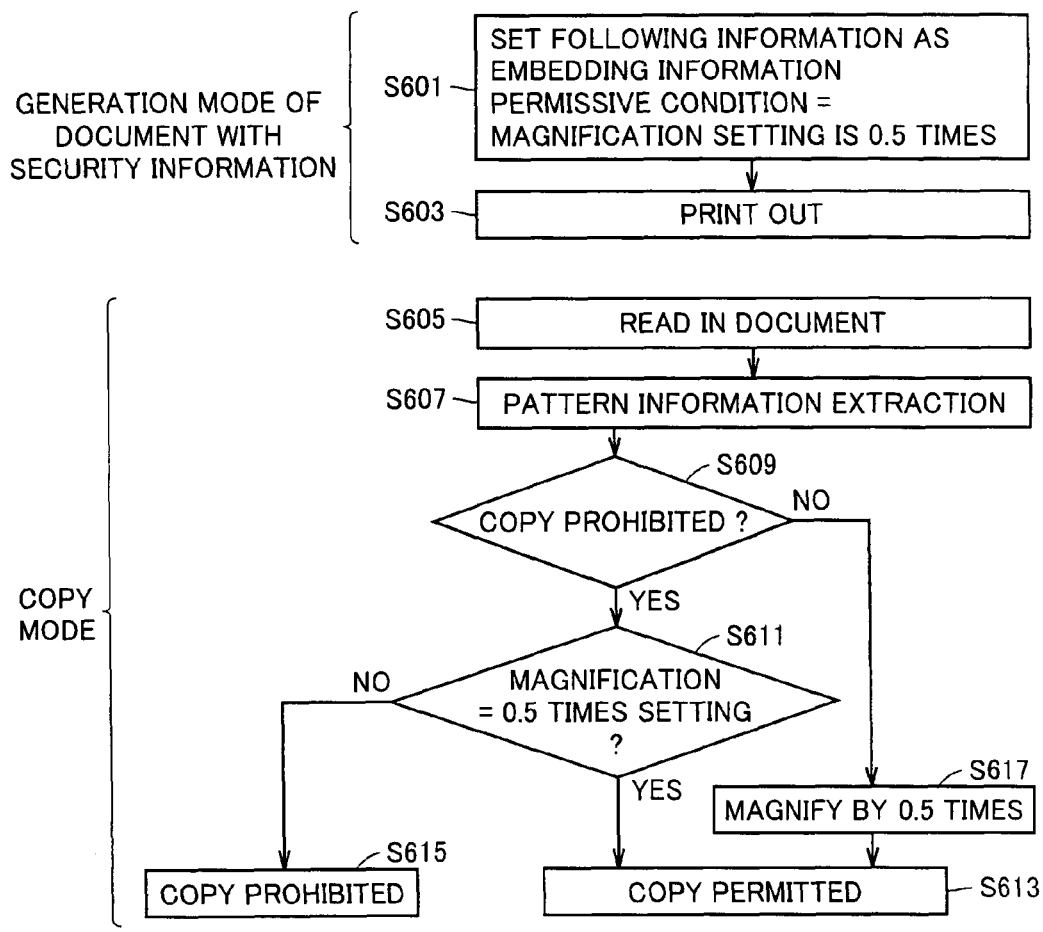
FIG. 21 is a flow chart of the process executed by an image formation apparatus according to a fourth embodiment.

FIG. 21 is a flow chart of the process executed by the image formation apparatus of the fourth embodiment.

At step S601 of FIG. 21, the copy prohibition information and the permissive condition of "magnification setting is 0.5 times" are set as the embedded information. At step S603, a printout is obtained based on that information.

At step S605, the document printed out at step S603 is read in. At step S607, information of the embedded ground tint pattern is extracted.

At step S609, determination is made whether copy prohibition information is embedded or not. When YES, control proceeds to step S611 to determine whether the magnification setting is 0.5 times. When YES at step S611, control proceeds to step S613 to permit copying. The actual process of shrinking the image to 0.5 times is not carried out (the magnification setting is ignored) since the setting of 0.5 times is only an input in lieu of a password.

When NO at step S611, control proceeds to step S615 to prohibit copying.

When NO at step S609, control proceeds to step S617 to change the size of the image to 0.5 times, as set. Then, control proceeds to step S613.

By the processes set forth above, the document copy condition functions in lieu of a password in the present embodiment. Therefore, copying can be permitted to only a specified user. Thus, the security feature can be maintained.

<Miscellaneous>

The first to third embodiments were described in which copying is permitted when the document orientation and/or page order corresponds to a specific state. The document orientation and/or page order can be modified to the former state at the time of copying. For example, when the documents set as shown in FIG. 17 are to be printed out, printing is effected with the ninth page and tenth page interchanged, to obtain a printout corresponding to the former order. Further, when documents set as shown in FIG. 19 are to be printed out, the orientation of the fifth page and tenth page can be altered to obtain a printout in the former form.

In addition to the above-described example of taking the document orientation (portrait orientation or landscape orientation) as the document read out condition, the document placement (center basis or edge basis), the document reading manner (whether by hand placement or by ADF) or the like may be used in lieu of a password as the document read out condition.

In addition to the example of the magnification setting as the copy condition (image editing condition), any setting that changes the output form from the original such as the density setting, color setting, 2in1 setting, staple setting, punch setting, or the like can be employed for the copy condition.

The above embodiments are based on a configuration in which the copy permissive condition is embedded into an image, which is used for copy control. Alternatively, a condition for controlling a particular feature of the image formation apparatus can be embedded, and used for control thereof. For example, control can be effected such that image reading, data output, or the like can be executed only when the permissive condition is met.

The processes of the above-described embodiments may be implemented by software, or by using a hardware circuit.

Further, although the copy permissive condition is embedded in an image, the copy permissive condition may be retained within the image information apparatus instead.

Further, a program executing the processes in the flow chart of the above-described embodiments can be provided. The program thereof can be recorded on a recording medium such as a CD-ROM, flexible disk, hard disk, ROM, RAM, memory card, or the like, and provided to the user. Additionally, the program may be down loaded to an apparatus via a communication line such as the Internet.

The present invention is applicable to both a system connected to a network and a system that is not connected to a network environment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus comprising:
   an acquirement portion for acquiring an image of a document read out,
   a detector for detecting at least one of a read out state of said image and a setting for copying said image acquired from the acquirement portion,
   a pattern determination unit for determining whether there is a permissive condition included in a copy prohibition pattern embedded in said image, the permissive condition being for at least one of a read out state and a setting for copying of said image, and
   a controller for permitting or prohibiting at least a part of an operation of said image processing apparatus based on a detected result of said detector, wherein the controller permits at least a part of an operation of said image processing apparatus only when the detected read out state or the setting for copying matches the permissive condition of the copy prohibition pattern.

2. The image processing apparatus according to claim 1, further comprising a printer for printing out said read out image, wherein said controller permits or prohibits printing by said printer.

3. The image processing apparatus according to claim 1, wherein said detector detects at least one of a document orientation, document position, and document reading manner.

4. The image processing apparatus according to claim 1, wherein
   said document is formed of a plurality of pages, and
   said detector detects an order of the pages of the document.

5. The image processing apparatus according to claim 1, wherein
   said document is formed of a plurality of pages, and
   said detector detects a combination of orientation of the document.

6. The image processing apparatus according to claim 1, wherein a page order of a read out document is interchanged to a proper order when the page order of said document differs from an original page order.

7. The image processing apparatus according to claim 1, wherein said detector detects at least one of a magnification setting, color setting, density setting, and 2 in 1 setting.

8. The image processing apparatus according to claim 1, wherein the setting for copying said image is employed as security information, and not used for a copy condition.

9. The image processing apparatus according to claim 1, further comprising:
   an image memory to store image data,
   a permissive condition setting portion to set at least one of the read out state of the image and the setting for copying said image, qualified as a condition for permitting processing on said image data at said image processing apparatus, a pattern converter converting said permissive condition into a pattern that can be detected in a document read out mode, a pattern combiner generating a combined image of said image data and said pattern, and an image output portion printing out a combined image of said pattern combiner.

10. An image processing method comprising:

an acquirement step of acquiring an image of a read out document, a detection step of detecting at least one of a read out state of said image and a setting for copying said image acquired from the acquired step, a pattern determination step of determining whether there is a permissive condition included in a copy prohibition pattern embedded in said image, the permissive condition being for at least one of a read out state and a setting for copying of said image, and a control step of permitting or prohibiting at least a part of an operation of an image processing apparatus based on a detected result at said detection step, wherein at least a part of an operation of said image processing apparatus is permitted only when the detected read out state or setting for copying matches the permissive condition of the copy prohibition pattern.

11. The image processing method according to claim 10, further comprising:

an image storing step of storing image data, a permissive condition setting step of setting at least one of the read out state of the image and the setting for copying said image, qualified as a condition for permitting processing on said image data at an image processing apparatus, a pattern conversion step of converting said permissive condition into a pattern that can be detected in a document read out mode, a pattern combining step of generating a combined image of said image data and said pattern, and an image output step of printing out a combined image of said pattern combining step.

12. An image processing program embodied on a non-transitory recording medium, for causing a computer to execute:

an acquirement step of acquiring an image of a read out document, a detection step of detecting at least one of a read out state of said image and a setting for copying said image acquired from the acquirement step, a pattern determination step of determining whether there is a permissive condition included in a copy prohibition pattern embedded in said image, the permissive condition being for at least one of a read out state and a setting for copying of said image, and a control step of permitting or prohibiting at least a part of an operation of an image processing apparatus based on a detected result at said detection step, wherein at least a part of an operation of said image processing apparatus is permitted only when the detected read out state or setting for copying matches the permissive condition of the copy prohibition pattern.

13. The image processing program embodied on a non-transitory recording medium, according to claim 12, further causing a computer to execute:

an image storing step of storing image data, a permissive condition setting step of setting at least one of the read out state of the image and the setting for copying said image, qualified as a condition for permitting processing on said image data at an image processing apparatus, a pattern conversion step of converting said permissive condition into a pattern that can be detected in a document read out mode, a pattern combining step of generating a combined image of said image data and said pattern, and an image output step of printing out a combined image of said pattern combining step.

* * * * *